United States Patent [19]

Manning

[11] 4,412,404
[45] Nov. 1, 1983

[54] COMBINED VENT AND ESCAPE HATCH

[75] Inventor: Donald L. Manning, Orchard Lake, Mich.

[73] Assignee: Transpec, Inc., Troy, Mich.

[21] Appl. No.: 369,387

[22] Filed: Apr. 19, 1982

[51] Int. Cl.³ ............... E05B 65/10; E05C 15/02; E05D 15/50

[52] U.S. Cl. ............... 52/19; 49/141; 49/193; 296/216; 296/224; 114/201 R; 114/203; 52/72; 292/263; 292/145

[58] Field of Search ............ 52/19, 72; 49/141, 193; 296/216, 224; 114/201 R, 203; 292/145, 149, 156, 162, 137, 263

[56] References Cited

U.S. PATENT DOCUMENTS

| | | | |
|---|---|---|---|
| 2,159,516 | 5/1939 | Ball | 49/193 |
| 2,173,890 | 9/1939 | Tuttle | 296/216 |
| 2,231,530 | 2/1941 | Edwards | 292/162 |
| 2,372,164 | 3/1945 | Woodhams | 49/342 |
| 2,517,303 | 8/1950 | Green | 49/363 |
| 3,676,954 | 7/1972 | Rapport et al. | 49/337 |
| 3,797,178 | 3/1974 | Mule | 49/193 |
| 4,021,073 | 5/1977 | Manning | 52/72 |
| 4,300,440 | 11/1981 | Holter | 49/193 |

FOREIGN PATENT DOCUMENTS 620009  6/1962  Belgium ............... 49/193

Primary Examiner—John E. Murtagh
Assistant Examiner—Michael Safavi
Attorney, Agent, or Firm—Reising, Ethington, Barnard, Perry & Milton

[57] ABSTRACT

A lid for a vehicle roof opening including a linkage hinging it to the roof structure to accommodate tilting of the lid upwardly in either of two directions, or elevating it bodily, for use of the opening to ventilate the vehicle and including provision for separating the linkage from the roof supporting structure to permit swinging the lid to a fully open position relative to the roof opening to provide an escape hatch.

7 Claims, 9 Drawing Figures

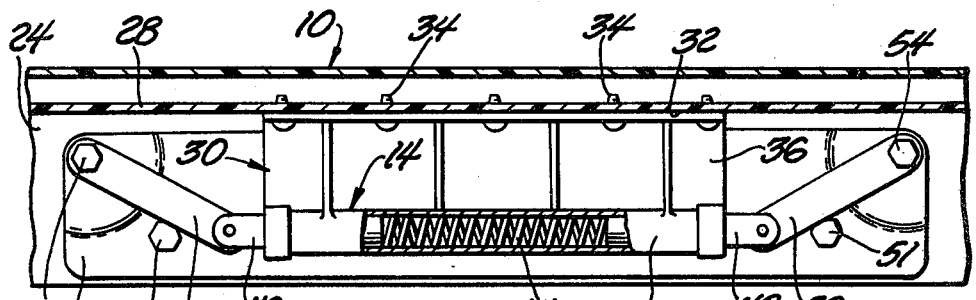
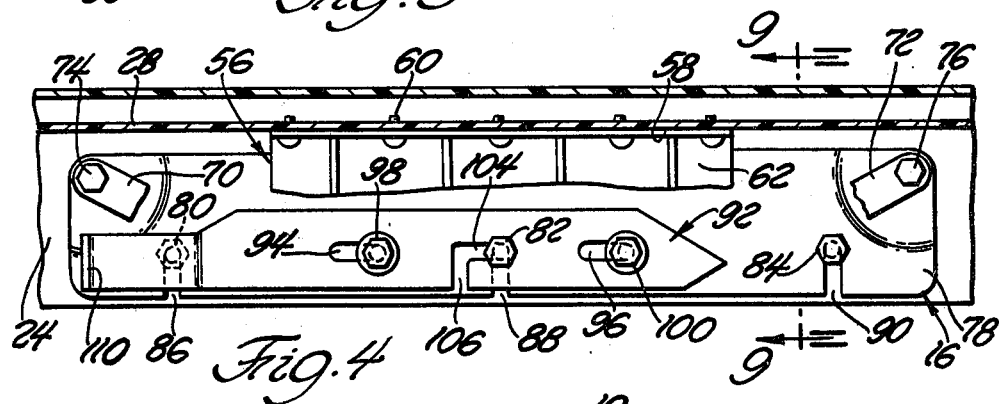
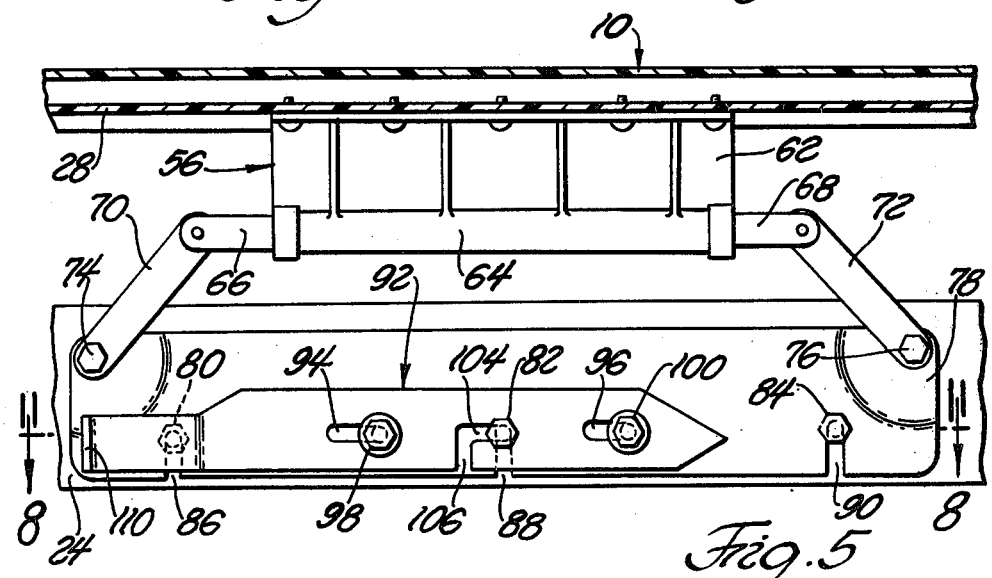
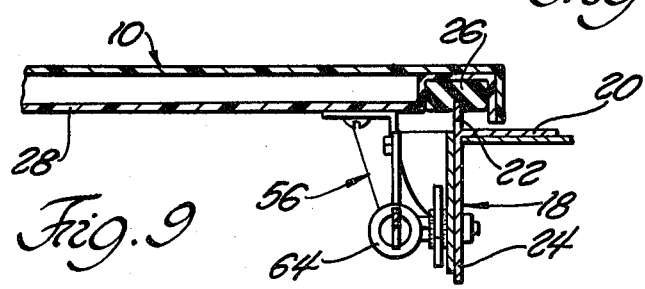

COMBINED VENT AND ESCAPE HATCH

TECHNICAL BACKGROUND

The invention relates to roof ventilators for closed vehicles such as buses, trailers, trucks, and railroad cars, and particularly to an improved closure or lid by which the ventilator opening in the roof of such a vehicle may also serve as an escape hatch for occupants in the vehicle in the event of an accident or other emergency rendering the normal means of egress unusable. More specifically, the invention is an improvement in the escape hatch operating mechanism as shown in my earlier U.S. Pat. No. 4,021,073.

In its more specific aspects, the invention provides a lid or hatch which in normal operation either closes the roof opening or is raised to a variety of partially elevated or open positions when ventilation of the vehicle so requires, and which lid can be manually released and forced upwardly to swing fully open in the event of an emergency requiring use of the roof opening as an escape hatch.

Roof ventilators employing a lid or hatch which can be tilted upwardly are well known in the prior art, including such a lid that can be so tilted in either of two directions for directing air into or exhausting air out of the vehicle. U.S. Pat. Nos. 2,173,890 to Tuttle and 2,372,164 to Woodhams, for example, show vehicle roof ventilator panels tiltable upwardly in one direction, and U.S. Pat. No. 2,159,516 to Ball shows one tiltable alternatively for exhausting air from the vehicle interior or by suction or by the deflection of air into the vehicle. Also, U.S. Pat. No. 2,517,303 to Green discloses a roof ventilator in which the closure lid may be raised vertically, rather than tilted angularly of the roof opening. Other than my own earlier patent, the closest art to the invention, of which applicant is aware, is probably U.S. Pat. No. 3,676,954 Rapport et al showing a lid for a vehicle roof vent opening which is tiltable upwardly to a venting position by means of a worm gear and wheel drive mechanism and which has means for unlatching the housing of the worm mechanism to allow the lid to be swung to a fully open position.

DESCRIPTION OF INVENTION

The present invention employs a simpler and less costly escape hatch operating mechanism as compared with prior art devices and including the inventor's earlier devices shown in U.S. Pat. No. 4,021,073. As with my earlier invention, a novel and advantageous feature of the present invention lies in the fact that it may also easily be incorporated in the operating mechanism which enables alternative two-way tilting and direct vertical elevation of the lid or hatch as well as in a more simple one-way tiltable vent lid.

While it is applicable to other vent operating mechanisms, the invention is illustrated in a preferred form of venting mechanism having a two-way tiltable and vertically raisable roof vent lid whose alternative positions are made possible by two hinging mechanisms each employing toggle-type linkages. Each of the toggle-type linkages includes a first bracket for securing the linkage to the vehicle structure proximate the hatch opening and a second bracket for supporting the lid or latch. The present invention is directed to a latching mechanism whereby one of said first bracket members is detachably or releasably secured to the vehicle structure to provide the escape hatch function. One of the designated first bracket members incorporates a slidable latch element for securing the bracket to or, in an emergency, releasing the bracket from the supporting vehicle structure whereby the lid or hatch may be thrown open to a fully open or passenger escape condition.

The advantages and details of the invention will be clearly understood and appreciated from the following description in an embodiment selected to best illustrate the principles involved and the preferred means for carrying out the same and having reference to the drawings wherein:

BRIEF DESCRIPTION OF DRAWINGS

FIG. 3 is a side elevational view along line 3—3 of FIG. 2;

FIG. 4 is a side elevational view along line 4—4 of FIG. 2;

FIG. 5 is a side elevational view of the linkage mechanism like FIG. 4 but with the lid raised to a ventilating position;

FIG. 9 is a cross sectional view along line 9—9 of FIG. 4.

BEST MODE FOR CARRYING OUT THE INVENTION

Figure 1:
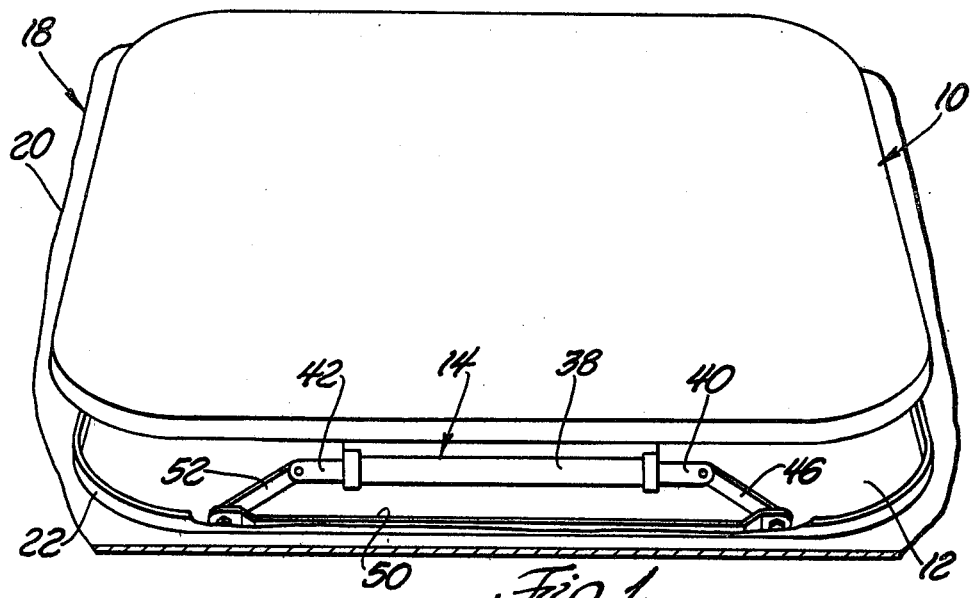
FIG. 1 is a top perspective view with the hatch or lid in an open or ventilating position.
Figure 2:
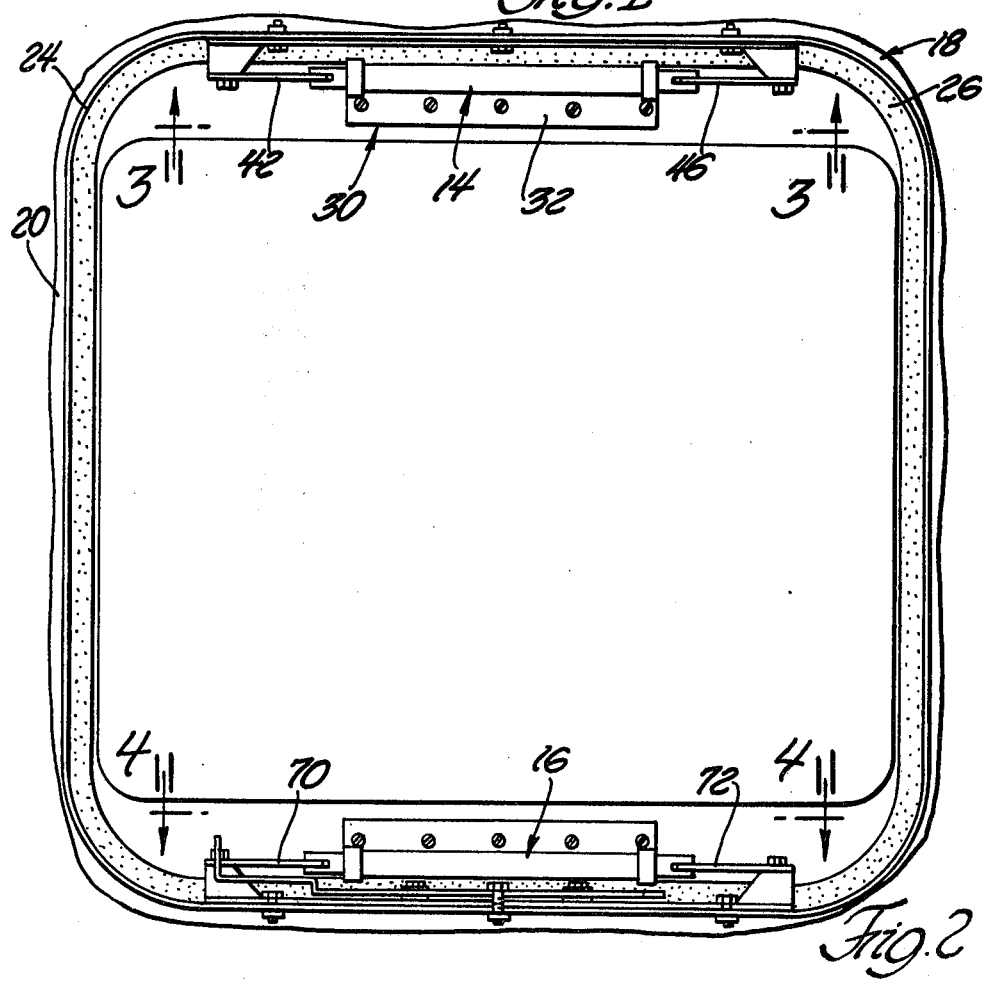
FIG. 2 is a bottom view through the roof opening with the lid in a closed position.

Referring first to FIGS. 1 and 2 of the drawings, an escape hatch or lid is indicated generally at 10 and is supported for various types of opening in relation to the vehicle opening 12 by a pair of toggle linkage mechanisms indicated generally at 14 and 16. While the toggle linkages 14 and 16 may be supported directly upon the vehicle roof structure proximate the opening formed therein, it is preferred to manufacture and supply the vent and escape hatch mechanism as an assembly which may be easily mounted within the vehicle roof opening in a way to assure proper alignment and functioning of all the parts. Accordingly, toggle linkages 14 and 16 are mounted upon a lid or hatch supporting ring indicated generally at 18 which is, in turn, mounted upon the vehicle roof surface in alignment with the roof vent opening 12. More specifically, the lid mounting ring 18 includes a generally flat rim portion 20 adapted to sit upon the vehicle roof surface and be suitably fastened thereto. Projecting respectively above and below rim portion 20 are generally vertically disposed flanges 22 and 24. As best seen in FIG. 9, when the lid or hatch 10 is in its closed position, an elastomeric sealing member 26 is disposed within a peripherally recessed portion of the interior lid wall 28 and coacts with upstanding ring flange 22 to seal the vehicle opening 12. The lower or downwardly projecting flange 24 corresponds generally in size and shape to the vehicle roof opening and aligns the ventilation and escape mechanism therewithin.

Except for the latching means whereby toggle linkage means 16 is detachable from the supporting ring 18, the toggle linkage mechanisms are identical. In order to understand the basic functioning of the toggle linkage mechanisms, linkage 14, which is permanently secured between ring 18 and lid 10, will first be described in detail. Referring particularly to FIG. 3, linkage or hinging means 14 includes a first bracket 30 having a laterally extending flange 32 underlying and secured to the lower panel 28 of lid 10 by suitable screws 34. Bracket 30 also includes a depending web section 36. Extending longitudinally with and secured to the lower extremities of the web section is an integrally formed cylindrical sleeve section 28 which rotatably and slidably supports two plungers 40 and 42. Within the sleeve section and biasing the plungers apart is a compression coil spring member 44. Pivotally connected to the outward end of plunger 40 is one end of a swinging link 46 whose other end is pivotally connected by pin 48 to a second support bracket 50. Likewise, the outer end of plunger 42 is pivotally connected to one end of a swinging link 52 whose opposite end is pivotally connected by a pin 54 to the same supporting bracket 50. The axes for swinging movement of the links 46 and 52, as defined by the pins 48 and 54, extend transversely of the bracket 50 and are spaced from each other on the supporting bracket so that by forcibly elevating the bracket 30 and lid 10 relative to the supporting bracket 50, either or both of the links 46 and 52 may be swung into longitudinal alignment with their respective plungers 40 and 42 thereby compressing the coil spring 44. When released, the compressive force of the spring, acting outwardly against the plungers causes each link 46 and 52 to swing either clockwise or counterclockwise depending upon whether its pivotal connection to its plunger is above or below the longitudinal axis of the sleeve section 38. Thus, an over-center toggle linkage relationship between each plunger 40 and 42 with its respective link 46 and 52 is provided which acts either to bias the lid 10 downwardly to its closed position shown in FIG. 3, or upwardly to a limited open position in which one or both of the links 46 or 52 are inclined upwardly from their pivot pins 48 and 52 as shown in FIG. 1. When the lid 10 is in its closed position, the opening 12 in the roof is sealed by abutment of the gasket material 26 on the underside of the lid with the ring flange 22. The lower toggle linkage supporting bracket 50 is secured to the lid mounting ring flange 24 by bolts 51.

In like manner and referring to FIGS. 4 through 9, the second toggle linkage mechanism or hinging means 16 is mounted to the underside of the lid 10 so as to extend within the roof opening 12 adjacent the opposite side thereof from the first toggle mechanism or hinging means 14. The second toggle or hinging means 16 likewise includes a bracket 56 having a flange 58 underlying and secured to the lower panel 28 of the lid 10 by screws 60, and a depending web section 62 having a cylindrical sleeve 64 formed integrally with its lower extremities. Within this sleeve section 64 are a pair of plungers 66 and 68, identical to the plungers 40 and 42, and a compression spring (not shown, but identical to spring 44) between plungers 66 and 68 and biasing them outwardly of the sleeve section. Also in identical manner to the first hinging means 14, the plungers 66 and 68 are pivotally connected to links 70 and 72 whose opposite ends are pivotally connected by pins 74 and 76 to a second supporting bracket 78. The spacing of pins 74 and 76 from each other is the same as that of pins 48 and 54.

Because of their parallel relationship and identical linkage geometry, the two toggle linkages or hinging means 14 and 16, which I do not claim to have invented per se, cooperate in either holding the lid fully closed against the ring flange 22 or positioning the lid in any one of a variety of partially open positions.

For example, starting with the lid 10 in its fully closed position, it may be tilted upwardly about its side intermediate the link pivot pins 48 and 54 by manually applying sufficient upward force to the underside of the lid in the area thereof intermediate said pivot pins to cause the links 46 and 52 to swing upwardly about their pivot pins 48 and 54 and thereby forcing their plungers 40 and 42 inwardly against the biasing force of the spring 44 in the bracket sleeve section 38 until the plunger connected ends of the links 46 and 52 pass "over-center", i.e. the longitudinal axis of the sleeve section extends above the pivot pins 48 and 54. Similarly, from a fully closed position, the lid may be tilted upwardly about its side intermediate the link pivot pins 74 and 76 by applying upward manual pressure to the area of the lid between said link pivot pins to cause the links 70 and 72 to swing upwardly about their pivot pins to a like "over-center" position. Also, with the lid tilted upwardly in either direction as described, it may also be additionally tilted in the opposite direction by manual application of upward force thereto in the area adjacent that side of the lid about which it had been previously tilted, thereby completing a bodily upward movement of the lid to the position shown in FIG. 1, wherein the lid accommodates "through-flow" ventilation of the interior of the vehicle. The links, by reason of their pivotal connections with their respective plungers and pivot pins secured respectively to the supporting brackets 50 and 78 also serve to limit the ventilation opening movement of the lid. Also, the lid will remain in whichever partially open position it is placed pending application of manual force to effect compression of the springs opposing the return of the links to their original position.

Figure 7:
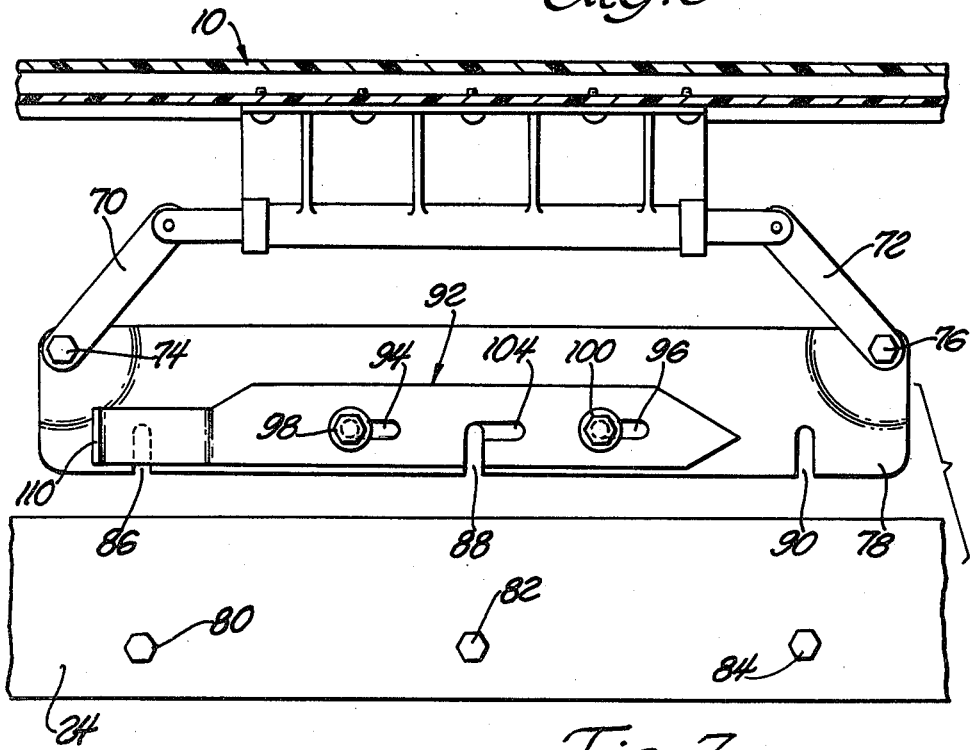
FIG. 7 is a progression from FIG. 6 with the linkage mechanism detached from the lid mounting ring as the lid is being moved to its passenger escape position.
Figure 8:
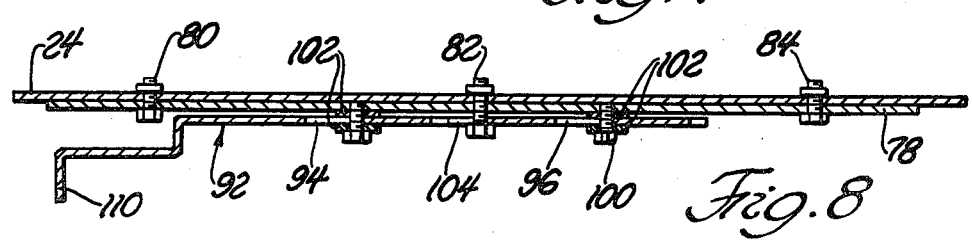
FIG. 8 is a sectional plan view along line 8—8 of FIG. 5.

The means by which the lid 10 may be fully opened to its passenger escape position will now be described. Referring particularly to FIGS. 4 through 9, it will be seen that three longitudinally aligned and spaced stud members 80, 82, and 84 project outwardly from flange 24 of mounting ring 18. Bracket 78 of toggle linkage mechanism 16 includes three downwardly opening slots 86, 88, and 90 corresponding in longitudinal spacing to the studs 80, 82, and 84. In order to assemble bracket 78 to ring 18, the bracket slots slide over the ring studs so as to be positioned between the ring flange 24 and the stud heads as best seen in FIG. 8. In order to detachably secure linkage bracket 78 to lid mounting ring 18, a latch element 92 is provided. A pair of longitudinally aligned slots 94 and 96 are formed in the latch element 92. A pair of stud elements 98 and 100 respectively extend through slots 94 and 96 and are secured to linkage bracket 78. Thus, latch element 92 may be shifted laterally relative to bracket 78 with such movement being limited by the studs 98 and 100 abutting against the respective ends of slots 94 and 96. As best seen in FIG. 8, to facilitate the sliding movement of the latch element 92 relative to bracket 78, low friction, e.g. nylon, washer elements 102 are disposed on both sides of the latch element and between the stud heads and the bracket 78. Intermediate the longitudinal slots 94 and 96 of latch element 92 is an inverted L-shaped slot having a horizontal portion 104 aligned with horizontal slots 94 and 96 and a downwardly opening slot portion 106.

Figure 6:
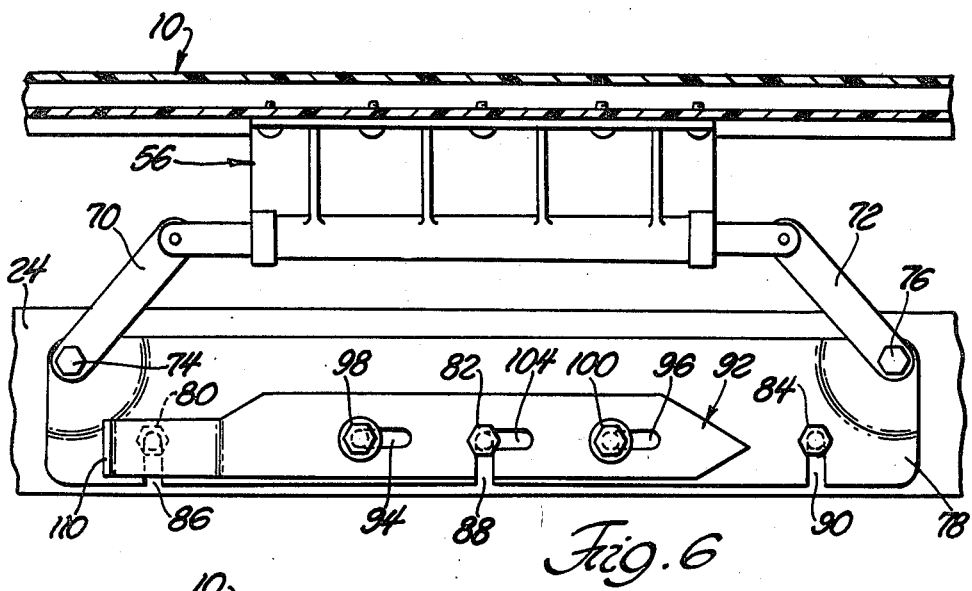
FIG. 6 is the same view as FIG. 5, however, with the linkage latch in its unlocked position and just prior to fully opening the lid to its passenger escape position.

In order to releasably mount bracket 78 upon ring 18, latch element 92 is laterally shifted to its rightmost position, as viewed in FIG. 6, wherein the bracket stud elements 98 and 100 are abuttingly engaged by the leftmost ends of slots 94 and 96 while the downwardly opening portion 106 of the inverted L-shaped slot is aligned with the adjacent slot member 88 of bracket 78. With the latch 92 in the rightmost position as just described, bracket 78 may slide downwardly such that the ring mounted studs 80, 82, and 84 respectively seat against the closed upper ends of downwardly opening bracket slots 86, 88, and 90. In order to lock the bracket 78 in this position, latch element 92 is now shifted to its leftmost position as shown in FIG. 4 wherein bracket stud elements 98 and 100 respectively abut against the rightmost positions of latch element slots 94 and 96. At the same time, the downwardly opening portion 106 of the inverted L-shaped slot is now moved out of alignment with ring stud 82 which now abuts against the rightmost end of latch slot portion 104 thereby preventing bracket 78 from being lifted or separated from lid supporting ring 18.

The emergency hatch release procedure will now be considered whereby the linkage mechanism 16 is mechanically detached from the lid-supporting ring 18 enabling lid 10 to be thrown to a fully open position by pivoting about linkage mechanism 14. For purposes of illustration, the emergency hatch opening sequence will begin with the parts in the position shown in FIG. 4 wherein latch element 92 is in its leftmost position such that ring stud 82 is at the rightmost end of latch slot 104 thereby preventing any upward movement of bracket member 78 relative to ring 18. The next step is to push up against the interior wall 28 of lid 10 in the area of linkage mechanism 16 whereby the linkage mechanism and lid are raised to the position shown in FIG. 5 exposing latch element 92. Next and as seen in FIG. 6, the latch element 92 is moved to its leftmost position aligning ring stud 82 with the vertical portion 106 of the inverted L-shaped slot. Further upward pressure on the lid will now cause linkage bracket 78 to be lifted off of ring studs 80, 82, and 84, as shown in FIG. 7, enabling the lid to be thrown to its fully open or passenger escape position.

As best seen in FIG. 8, the left end of latch element 92 is offset to assure clearance of the latch relative to ring stud 80 and also to provide a tab 110 which is grasped by a passenger to impart lateral movement to the latch element.

It is apparent that other modifications are possible within the intended scope of the invention as set forth in the hereinafter appended claims.

What is claimed is:

1. A combined vent and escape hatch assembly of the type adapted to be mounted in an opening on a vehicle roof, said assembly comprising a lid, a lid supporting ring of generally the same shape and size as the roof opening and mounted on said roof so as to surround said opening, a pair of linkage mechanisms mounted on laterally opposite sides of and connected between said lid and said ring, each linkage mechanism comprising first and second bracket members respectively connected to said lid and said ring and lever means interconnecting said bracket members to permit said lid to be moved between a seated position upon said ring closing the roof opening and a plurality of partially opened venting positions in which the id is supported by both of said linkage mechanisms, and a latching means for disconnecting one of said linkage mechanisms whereby the lid may be moved to a fully opened position relative to the roof opening, the improvement in said latching means comprising:

A. a latch element slidably mounted on one of said second bracket members; and
B. said ring including means for supporting one second bracket member, said latch element being adapted to coact with the bracket supporting means to releasably lock said one second bracket member against movement relative to said ring.

2. A combined vent and escape hatch assembly of the type adapted to be mounted in an opening on a vehicle roof, said assembly comprising a lid, a lid supporting ring of generally the same shape and size as the roof opening and mounted on said roof so as to surround said opening, a pair of linkage mechanisms mounted on laterally opposite sides of and connected between said lid and said ring, each linkage mechanism comprising first and second bracket members respectively connected to said lid and said ring and lever means interconnecting said bracket members to permit said lid to be moved between a seated position upon said ring closing the roof opening and a plurality of partially opened venting positions in which the lid is supported by both of said linkage mechanisms, and a latching means for disconnecting one of said linkage mechanisms whereby the lid may be moved to a fully opened position relative to the roof opening, the improvement in said latching means comprising:

A. stud means projecting laterally inwardly from said ring;
B. downwardly opening groove means formed in one of said second bracket members and coacting with said stud means to support said bracket thereon; and
C. a latch element adapted to retain said stud means within said groove means to releasably lock said second bracket member to said lid mounting ring.

3. A combined vent and escape hatch assembly as set forth in claim 2 wherein said latch element is slidably mounted upon said one second bracket member and includes a downwardly opening groove portion which terminates at its upper end in a laterally extending groove portion, said latch element being slidable to a first position in which its downwardly open groove portion overlays and is aligned with said bracket groove means to receive said stud means, said latch element being slidable to a second position wherein the laterally extending groove portion coacts with said stud means to releasably lock said second bracket to said ring.

4. A combined vent and escape hatch assembly of the type adapted to be mounted in an opening on a vehicle roof, said assembly comprising a lid, a lid supporting ring of generally the same shape and size as the roof opening and mounted on said roof so as to surround said opening, a pair of linkage mechanisms mounted on laterally opposite sides of and connected between said lid and said ring, each linkage mechanism comprising first and second bracket members respectively connected to said lid and said ring and lever means interconnecting said bracket members to permit said lid to be moved between a seated position upon said ring closing the roof opening and a plurality of partially opened venting positions in which the lid is supported by both of said linkage mechanisms, and a latching means for disconnecting one of said linkage mechanisms whereby the lid may be moved to a fully opened position relative to the roof opening, the improvement in said latching means comprising:

A. a plurality of aligned stud elements projecting laterally from said lid supporting ring;

B. one of said second bracket members including a plurality of downwardly opening grooves each adapted respectively to slidably engage with one of said stud elements to support said one second bracket thereupon; and C. latch means adapted to coact with one of said stud elements to releasably lock said one second bracket to said ring.

5. A combined vent and escape hatch assembly of the type adapted to be mounted in an opening on a vehicle roof, said assembly comprising a lid, a lid supporting ring of generally the same shape and size as the roof opening and mounted on said roof so as to surround said opening, a pair of linkage mechanisms mounted on laterally opposite sides of and connected between said lid and said ring, each linkage mechanism comprising first and second bracket members respectively connected to said lid and said ring and lever means interconnecting said bracket members to permit said lid to be moved between a seated position upon said ring closing the roof opening and a plurality of partially opened venting positions in which the lid is supported by both of said linkage mechanisms, and a latching means for disconnecting one of said linkage mechanisms whereby the lid may be moved to a fully opened position relative to the roof opening, the improvement in said latching means comprising:

A. three longitudinally spaced stud elements projecting laterally inwardly from said ring and having heads laterally spaced from said ring;

B. three downwardly opening groove means formed in one of said second bracket members and each groove means respectively coacting with one of said stud elements to support said bracket thereon between said heads and said ring; and C. a latch element slidably mounted on said one bracket member and adapted to coact with one of said stud elements to releasably lock said second bracket to said lid mounting ring.

6. A combined vent and escape hatch assembly of the type adapted to be mounted in an opening on a vehicle roof, said assembly comprising a lid, a lid supporting ring of generally the same shape and size as the roof opening and mounted on said roof so as to surround said opening, a pair of linkage mechanisms mounted on laterally opposite sides of and connected between said lid and said ring, each linkage mechanism comprising first and second bracket members respectively connected to said lid and said ring and lever means interconnecting said bracket members to permit said lid to be moved between a seated position upon said ring closing the roof opening and a plurality of partially opened venting positions in which the lid is supported by both of said linkage mechanisms, and a latching means for disconnecting one of said linkage mechanisms whereby the lid may be moved to a fully opened position relative to the roof opening, the improvement in said latching means comprising:

A. a stud means projecting laterally inwardly from said ring;

B. downwardly opening groove means formed in one of said second bracket members and coacting with said stud means to support said bracket thereon; and C. a latch element slidably mounted on said second bracket, said latch element movable to a first position coacting with said stud means to prevent movement of said second bracket relative to said ring and movable to a second position disengaged with the stud means allowing said second bracket to be disconnected from said ring.

7. A combined vent and escape hatch assembly of the type set forth in claim 3 wherein said latch element includes a pair of horizontally extending slots respectively disposed on laterally opposite sides of the downwardly opening groove portion and a pair of stud elements respectively projecting through and coacting with the latch slots to slidably support the latch element upon said one second bracket member.

* * * * *